United States Patent
Wei et al.

(10) Patent No.: US 7,368,977 B2
(45) Date of Patent: May 6, 2008

(54) DIMMING METHOD AND SYSTEM THEREOF

(75) Inventors: Wei-Hsin Wei, Hsin-Chu (TW);
Shui-Mu Lin, Taichung (TW);
Chien-Sheng Chen, Maio-Li (TW);
Tsung-Wei Huang, Taipei (TW);
Chin-Chiang Yeh, Kaohsiung (TW);
Chin-Tsung Chen, Taipei (TW)

(73) Assignee: Richtek Technology Corp., Hsinchu Hsien (TW)

( * ) Notice: Subject to any disclaimer, the term of this patent is extended or adjusted under 35 U.S.C. 154(b) by 0 days.

(21) Appl. No.: 11/288,242

(22) Filed: Nov. 29, 2005

(65) Prior Publication Data

US 2006/0279565 A1    Dec. 14, 2006

(30) Foreign Application Priority Data

Jun. 14, 2005   (TW) .............................. 94119684 A

(51) Int. Cl.
*G05F 1/10*   (2006.01)
(52) U.S. Cl. .................. 327/536; 327/534; 363/60; 363/62; 315/291
(58) Field of Classification Search ............ 315/209 R, 315/224–226, 291, 307, 308, 312; 345/102, 345/212; 327/143, 148, 157, 534–536, 538, 327/540; 363/59, 60, 62
See application file for complete search history.

(56) References Cited

U.S. PATENT DOCUMENTS

| | | | | |
|---|---|---|---|---|
| 5,920,225 A * | 7/1999 | Choi et al. | .................. | 327/536 |
| 6,107,862 A * | 8/2000 | Mukainakano et al. | ..... | 327/536 |
| 6,111,470 A * | 8/2000 | Dufour | ......................... | 331/17 |
| 6,522,558 B2 * | 2/2003 | Henry | .......................... | 363/60 |
| 6,556,067 B2 * | 4/2003 | Henry | .......................... | 327/536 |
| 6,812,776 B2 * | 11/2004 | Henry | .......................... | 327/536 |
| 6,897,709 B2 * | 5/2005 | Henry | .......................... | 327/536 |
| 2002/0067145 A1 * | 6/2002 | Ribarich | ..................... | 315/291 |
| 2004/0080361 A1 * | 4/2004 | Henry | .......................... | 327/536 |
| 2005/0083110 A1 * | 4/2005 | Latham et al. | ............... | 327/538 |
| 2006/0186830 A1 * | 8/2006 | Shami et al. | ................ | 315/291 |

* cited by examiner

*Primary Examiner*—Thuy V. Tran
*Assistant Examiner*—Tung X Le
(74) *Attorney, Agent, or Firm*—Birch, Stewart, Kolasch & Birch, LLP

(57) ABSTRACT

A dimming method for LED driving circuit is proposed. By temporary switching a pin that is originally used for the input/output of other electric signals to a high impedance node, the dimming control signal may be inputted to dim LEDs. The dimming method comprises the steps of: floating the pin every a period of time to pull the pin's voltage being equal to the dimming control signal; detecting the pin's voltage; and retrieving the dimming control signal in accordance with the detected pin's voltage and thereafter dimming the LEDs.

16 Claims, 4 Drawing Sheets

DIMMING METHOD AND SYSTEM THEREOF

BACKGROUND OF THE INVENTION

1. Field of the Invention

The present invention generally relates to a dimming method of Light Emitting Diode (LED). More particularly, the present invention relates to an LED dimming method, which utilizes high impedance node for inputting a dimming control signal but without the usage of an enable pin additionally.

2. Description of the Prior Art

Nowadays, many consumer electronic products contain LCD panel, such as cell phone, PDA, and MP3 player . . . etc. The designer chooses not only the preferred sizes of the LCD panel, but also determines the types of the LCD panel and thereafter the power supply and the back-light circuit thereof in accordance with different applications. Among all kinds of the back-light circuit solutions, white LED is the most adopted solution to portable consumer electronic products.

Generally, the white LED solution may be categorized into the charge pump solution and the inductance-based solution. Herein the charge pump solution is also called switching capacitance solution, which transfers the power from the input terminal to the output terminal by switching the connections between the input terminal with a flying capacitance and between the flying capacitance with the output terminal. The whole switching process is unnecessary of any inductance device. Besides, charge pump devices occupy less volume and benefit in ease of design—the designer usually has no need to change the architecture of the charge pump driving circuitry but only chooses a proper capacitance device according to different demands, hence the charge pump solution is very popular.

In many situations, the LCD panel requires dimming functions. For example, the user may want to brighten a cell phone's or a PDA's screen while under dark environment, or lower the brightness of a cell phone and cut the back-light off after idled for a period of time. A well-known LED dimming method is Pulse Width Modulation (PWM) dimming technique, in which the LED dimming signal is modulated in PWM signal. With further classification, one of the PWM-based dimming methods adjusts the current flowed into the LED by changing the "duty cycle" of the PWM dimming signal. For example, if the duty cycle of the PWM dimming signal is 60%, the current flowed into the LED will be about 60% of the max value, and the brightness of the LED will decrease 60%. Another PWM-based dimming method dims the LED by adjusting the pulse numbers of the PWM signal. For example, the MAX1574 series white LED controller of the MAXIM INC. decreases the brightness of the driving LED with 10% each time after the controller received a pulse of PWM signal. The above-mentioned two types of dimming methods are the most popular, even if they are a little different, but they both use PWM signal to dim LED.

Referring to FIG. 1, FIG. 1 demonstrates a conventional LED driving circuit based on charge pump solution. The LED driving IC 10 includes a charge pump 12, a chip enable/dimming control module 14 and a current sink 16. Herein, the pin CP and CN of the LED driving IC 10 are connected to a transfer-capacitor (fly capacitor) Cf, which couples the electric current from the input terminal VIN to the output terminal VOUT for driving LEDs. The current sink 16 controls and provides stable current flowed through the LEDs while there are no external dimming signals. The chip enable/dimming control module 14 receives dimming control signals from the chip-enable pin EN to control the ON/OFF of the charge pump 12 and the current sink 16, thereby achieving the main object of the LED driving circuit: control the current flowed through the LEDs and then dim the LEDs.

No matter which company's LED driving IC is, most of them need a chip-enable pin as the input node for receiving dimming control signals. If the LED driving IC could receive dimming control signals without any single input pin (chip-enable pin), the pin's numbers could effectively reduced and thereafter the package size of the IC could be reduced, too. In additions, the package cost also could be decreased because of less pins of the IC, and the LED driving circuit with the improved IC will be cheaper and more competitive.

SUMMARY OF THE INVENTION

In view of the foregoing, an object of the present invention is to provide a dimming method, which is capable of receiving dimming control signals without any single input pin.

It is another object of the present invention to provide an LED driving IC. The present LED driving IC does not need any single pin particularly used to receive dimming control signals, therefore the pin's numbers, the package size and the manufacturing cost of the IC could be reduced accordingly.

The present invention proposes a dimming method applied to driving LED, which receives dimming control signals by utilizing a pin with the other signals in common. The present dimming method includes the steps of: every a period of time, floating the pin for an inputted dimming control signal pulling the voltage of the pin up and having the same potential; sampling the voltage of the pin; and restoring the dimming control signal according to the sampled voltage. Wherein, the dimming control signal is pulse width modulated signal, and the step to float the pin is accomplished by temporally switching the pin as a high impedance node.

Further scope of die applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Some preferred embodiments of the present invention will be described in detail in the following. However, beside the detailed description, the present invention can also be applied widely in other embodiments and the scope of the present invention is only limited by the appended claims.

Figure 1:
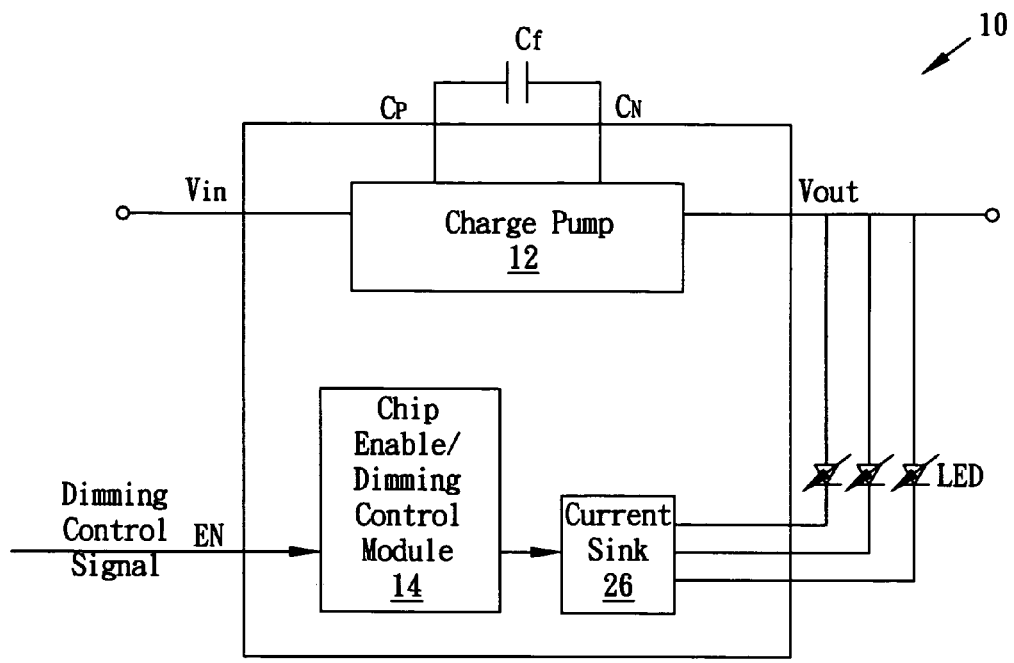
FIG. 1 demonstrates a conventional white LED driving circuit based on charge pump solution.
Figure 2:
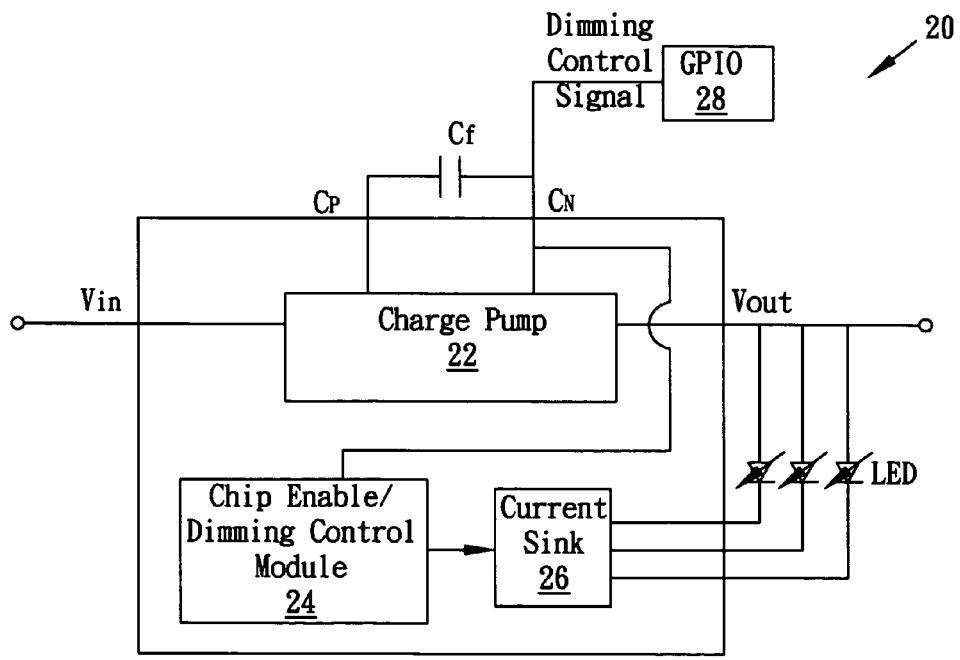
FIG. 2 demonstrates an LED driving circuit with a preferred embodiment of the present invention.

The main spirit of the present invention is, instead of the ordinal chip-enable pin, the LED driving IC utilizes a pin which is set for the other signals or purposes as the input node of dimming control signals, thereby reducing the pin's numbers to have smaller package of the IC. FIG. 2 demonstrates an LED driving circuit with a preferred embodiment of the present invention. Unlike the conventional LED driving circuit shown in FIG. 1, the present LED driving IC 20 excludes a chip-enable pin EN. The dimming control signals generated from the General Purpose Input/Output (GPIO) module 28 are firstly inputted to the pin CN of the charge pump 22, and then transferred to the chip-enable/dimming control module 24. In the other words, the pin CN replaces the original chip-enable pin EN and becomes the input node for receiving dimming control signals.

Figure 3A:
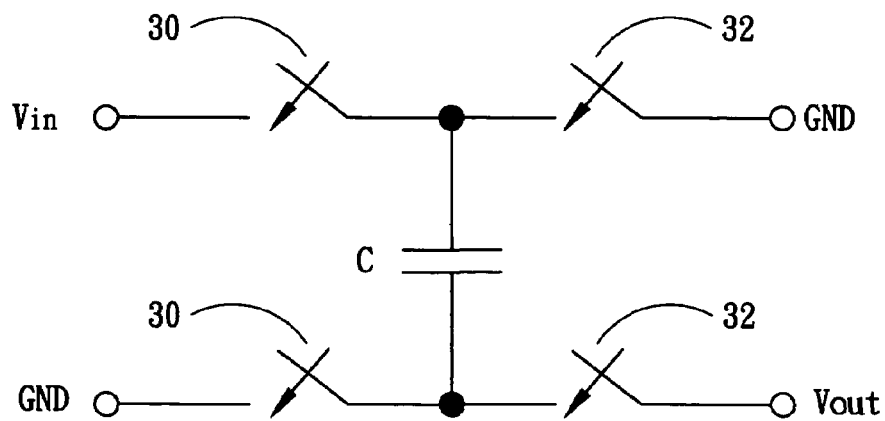
FIG. 3A is the simple diagram of a charge pump.
Figure 3B:
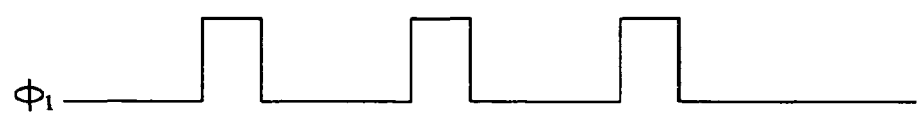
FIG. 3B shows the timing relationship of the switching signal of a charge pump.
Figure 3B:

Before the detail descriptions about the present LED driving circuit shown in FIG. 2, a brief operation principle of a charge pump is described in first. FIG. 3A depicts a simple diagram of a charge pump. In addition to a capacitor C, there are further two sets of switches 30 and 32 that controlled by two non-overlapped switching signals $\phi 1$ and $\phi 2$ (referring to FIG. 3B), wherein each set of switches are closed while the switching signals ($\phi 1$ or $\phi 2$) change to high level. When the switching signal $\phi 1$ changes to high, the first set of switches 30 are closed and the second set of switches 32 are open, therefore an external power source across the Vin and the GND terminal may charge the capacitor C. When the switching signals $\phi 2$ changes to high (the switching signal $\phi 1$ stays low), the first set of switches 30 are opened and the second set of switches 32 are closed, therefore the capacitor C discharges to the Vout terminal to drive loads (for example, the LEDs). Generally, frequencies of the switching signals $\phi 1$ and $\phi 2$ are scaled in MHz, and the charge pump couples current from the input terminal Vin to the output terminal Vout by continuing switching the connections of the capacitor C.

Figure 4A:
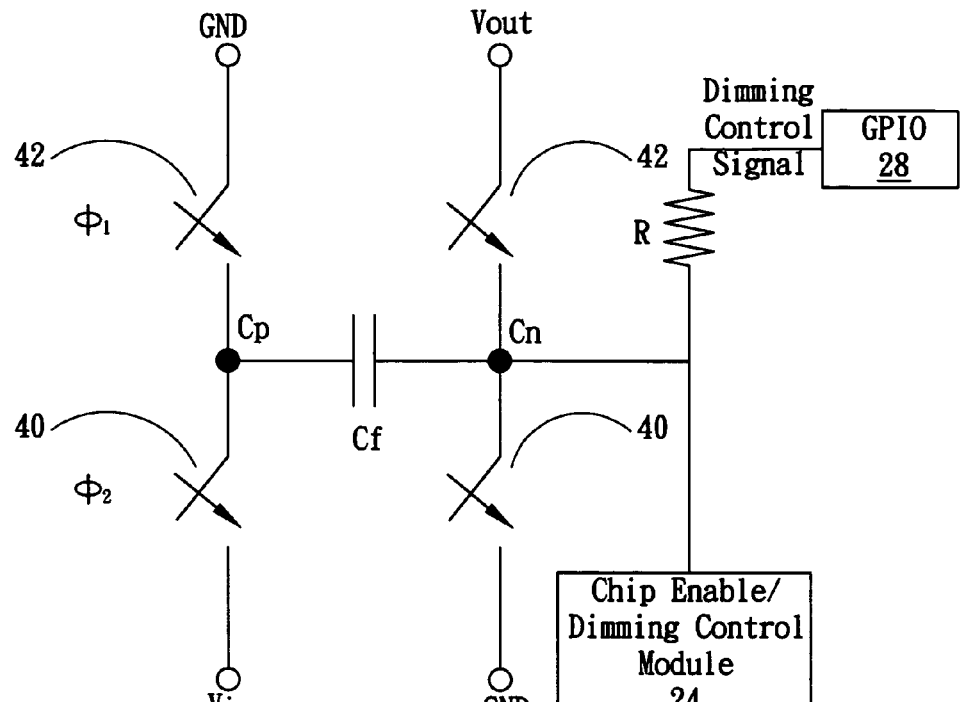
FIG. 4A depicts the connection relationships between the charge pump 22 and the inputted dimming control signal.

Referring to FIG. 4A, for conciseness of the specification, the charge pump 22 and the transfer capacitor Cf shown in FIG. 2 could be implemented by the charge pump shown in FIG. 3A. As mentioned above, dimming control signals are inputted through the pin CN and then transferred to the chip-enable/dimming control module 24, and the chip-enable/dimming control module 24 detects voltage of the pin CN to retrieve the dimming control signals. The resistor R is used to limit the current outputted from the GPIO 28.

Since the GPIO 28 has smaller current-driving force than the external power source, the pin CN is responsive of the across voltage of the transfer capacitor Cf as under normal operation of the charge pump 22. Hence, the chip-enable/dimming control module 24 could not detect and sample the inputted dimming control signals directly. In order to make the voltage of the pin CN being responsive of the dimming control signals, a method is proposed in the present invention. Referring to FIG. 4A, by temporally closing the switches 40 and 42, the pin CN will be floated and therefore be responsive of the inputted dimming control signals.

Figure 4B:
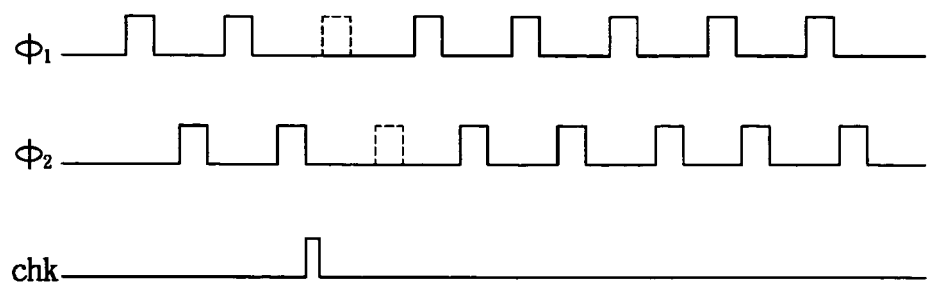
FIG. 4B depicts the timing diagram of the circuitry shown in FIG. 4A.

FIG. 4B depicts the timing relationship between of the circuitry shown in FIG. 4A. In side the driving IC 20, a checking signal chk is generated periodically, which could stop the switching signal $\phi 1$ and $\phi 2$ for one or several time interval. During the period that both the switching signal $\phi 1$ and $\phi 2$ are low, the chip-enable/dimming control module 24 detects and samples the voltage of the pin CN, and therefore retrieves the dimming control signals inputted from the GPIO 28. The checking signal chk could be generated by the chip-enable/dimming control module 24 or an internal clock (not shown in the drawing) of the driving IC 20, and it's not limited in the present invention. When the switching signals $\phi 1$ and $\phi 2$ are both low and thereafter the switches 40 and 42 are both OFF, since one terminal of the transfer capacitor Cf (Pin CP) is open, so the pin CN becomes a high impedance node and is floating. It results in the GPIO 28 being able to pull the voltage of the pin CN up to high (or low, according to the dimming control signal). In the other words, while the switches 40 and 42 are both OFF, the voltage of the pin CN could be pulled up rapidly to have the same voltage with the dimming control signals because the pin CN is currently a high impedance, thereby making the chip-enable/dimming control module 24 being able to detect and sample the dimming control signals. With higher frequency of the checking signal chk, the sampled dimming control signals are closer to the original signal waveform, so that the chip-enable/dimming control module 24 could control the current sink 26 or ON/OFF of the driving IC 20 itself for dimming the LEDs accordingly.

Figure 5A:
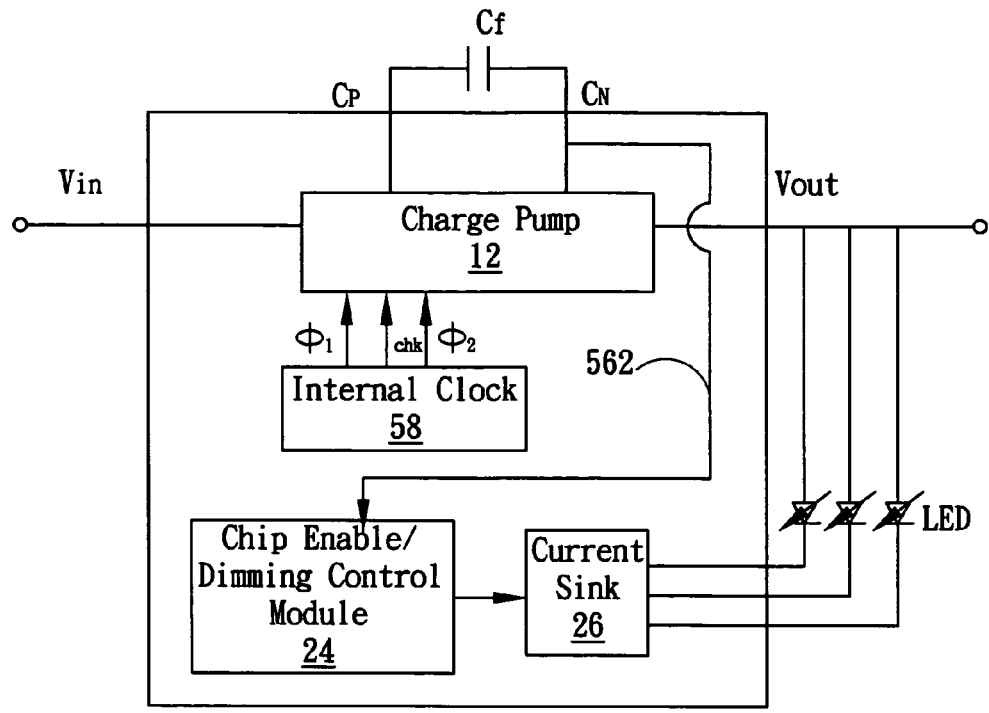
FIG. 5A depicts an embodiment LED driving circuit with the present LED driving IC of the invention.
Figure 5B:
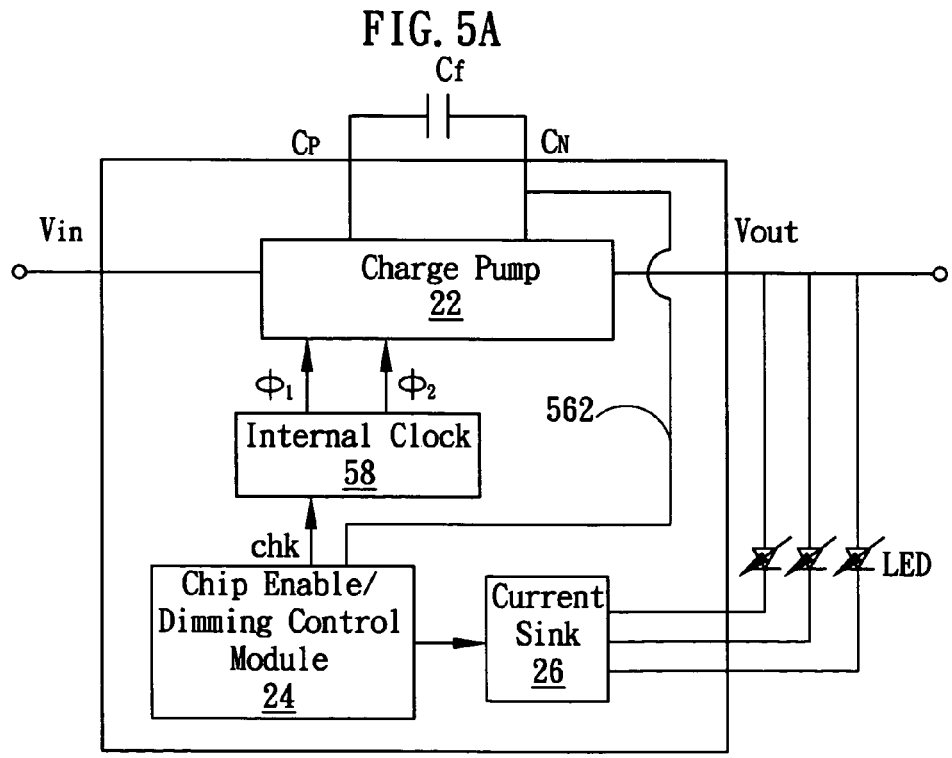
FIG. 5B depicts another embodiment LED driving circuit with the present LED driving IC of the invention

Hence, the chip-enable pin EN could be reduced while packaging the driving IC, and the present invention may achieves the object of the invention for reducing the pin's numbers, decreasing the volume of the IC and the manufacturing cost. Furthermore, FIG. 5A depicts an embodiment LED driving circuit that applies the present invention which includes: a charge pump 22, a chip-enable/dimming control module 24 and an internal clock 58, wherein the pin CN is directly connected to the chip-enable/dimming control module 24 by reference to the transmission line 562. The difference to the prior art is, not only the switching signals $\phi 1$ and $\phi 2$, the internal clock 58 also generates the checking signal chk for periodically stopping the switching signals $\phi 1$ and $\phi 2$. Moreover, as well as another embodiment shown in FIG. 5B, the checking signal chk could be generated by the chip-enable/dimming control module 24 instead, as well as the previous descriptions. While applying the LED driving IC of FIG. 5A or 5B to the LED driving circuit shown in FIG. 2, the dimming control signals could be inputted through the pin CN directly.

In view of the foregoing, the main spirit of the dimming method is: the method temporally switches a specific pin of the driving IC to high impedance, by which the GPIO pulls the voltage of the specific pin up and therefore be responsive of the dimming control signals. Hence, it should be understood that the present invention does not limit the specific pin to the pin CN only, but the pin CP or anyone else is also possible.

In further, the present invention not only applies to the white LED driving circuit described in foregoing paragraphs but also the other applications. If the designer could find and temporally switch a pin of an IC to high impedance, a control signal could be inputted even without a specific pin for the control signal. Of course, the condition lies on there is no influence on the normal operation of the other signals that inputted/outputted through that specific pin.

Although the description discloses the preferred embodiment herein, it is not limit the spirit of the invention. It is intended that the specification and examples to be considered as exemplary only, with a true scope and spirit of the invention being indicated by the following claims.

What is claimed is:

1. An LED driving integrated circuit comprising:
   a charge pump for coupling current from an input terminal to an output terminal, wherein said charge pump is further electrically connected with a pair of pins for connecting at least a capacitor;
   a control module electrically connecting with one of the pair of pins for receiving a dimming control signal, wherein said control module controls ON/OFF of the LED driving integrated circuit and the charge pump; and
   an internal clock, wherein said internal clock generates a plurality of switching signals to the charge pump;
   wherein the internal clock further generates a checking signal, according to said checking signal the LED driving integrated circuit floats one of the pair of pins to make the control module detecting said dimming control signal.

2. The LED driving integrated circuit of claim 1 further comprising a current sink for controlling current flowing into at least a load connecting to said output terminal.

3. The LED driving integrated circuit of claim 2, wherein said load is an LED.

4. The LED driving integrated circuit of claim 1, wherein said checking signal stops said plurality of switching signals with at least a period of time for floating one of the pair of pins.

5. The LED driving integrated circuit of claim 1, wherein said dimming control signal is a PWM signal.

6. The LED driving integrated circuit of claim 1, wherein said dimming control signal is outputted from GPIO.

7. The LED driving integrated circuit of claim 1, wherein said pair of pins are respectively pin CP and pin CN of the LED driving integrated circuit.

8. The LED driving integrated circuit of claim 1, wherein said dimming control signal is outputted from GPIO.

9. The LED driving integrated circuit of claim 1, wherein said pair of pins are respectively pin CP and pin CN of the LED driving integrated circuit.

10. An LED driving integrated circuit comprising:
    a charge pump for coupling current from an input terminal to an output terminal, wherein said charge pump is further electrically connected with a pair of pins for connecting at least a capacitor;
    a control module electrically connecting with one of the pair of pins for receiving a dimming control signal, wherein said control module controls ON/OFF of the LED driving integrated circuit and the charge pump; and
    an internal clock, wherein said internal clock generates a plurality of switching signals to the charge pump;
    wherein said control module further generates a checking signal, according to said checking signal the LED driving integrated circuit floats one of the pair of pins to make the control module detecting said dimming control signal.

11. The LED driving integrated circuit of claim 10, further comprising a current sink for controlling current flowing into at least a load connecting to said output terminal.

12. The LED driving integrated circuit of claim 11, wherein said load is an LED.

13. The LED driving integrated circuit of claim 10, wherein said checking signal stops said plurality of switching signals with at least a period of time for floating one of the pair of pins.

14. The LED driving integrated circuit of claim 10, wherein said checking signal is transferred to said internal clock for stopping said plurality of switching signals with at least a period of time.

15. The LED driving integrated circuit of claim 10, wherein said checking signal is transferred to said charge pump for stopping said plurality of switching signals with at least a period of time.

16. The LED driving integrated circuit of claim 10, wherein said dimming control signal is a PWM signal.

* * * * *